United States Patent
Maluf et al.

(10) Patent No.: US 6,629,465 B1
(45) Date of Patent: *Oct. 7, 2003

(54) MINIATURE GAUGE PRESSURE SENSOR USING SILICON FUSION BONDING AND BACK ETCHING

(75) Inventors: Nadim I. Maluf, Mountain View, CA (US); John R. Logan, Danville, CA (US); Gertjan van Sprakelaar, Fremont, CA (US)

(73) Assignee: NovaSensor Inc., Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/449,009

(22) Filed: Nov. 24, 1999

Related U.S. Application Data

(63) Continuation of application No. 08/944,733, filed on Oct. 6, 1997, now Pat. No. 6,038,928.
(60) Provisional application No. 60/027,515, filed on Oct. 7, 1996.

(51) Int. Cl.$^7$ .............................. G01L 9/06; G01L 9/12
(52) U.S. Cl. ............................. 73/724; 73/715; 73/718
(58) Field of Search ...................... 73/724, 718, 715, 73/727, 721, 756; 438/53; 257/419

(56) References Cited

U.S. PATENT DOCUMENTS

| | | | |
|---|---|---|---|
| 4,821,997 A | * | 4/1989 | Zdeblick ................. 251/11 |
| 4,829,018 A | | 5/1989 | Wahlstrom |
| 4,904,978 A | | 2/1990 | Barth et al. |
| 5,060,526 A | | 10/1991 | Barth et al. |
| 5,062,302 A | | 11/1991 | Petersen et al. |
| 5,134,887 A | * | 8/1992 | Bell ...................... 73/718 |
| 5,273,205 A | | 12/1993 | Ju et al. |
| 5,286,671 A | | 2/1994 | Kurtz et al. |
| 5,294,760 A | | 3/1994 | Bower et al. |
| 5,295,395 A | | 3/1994 | Hocker et al. |
| 5,332,469 A | * | 7/1994 | Mastrangelo .......... 156/643 |

(List continued on next page.)

FOREIGN PATENT DOCUMENTS

| | | |
|---|---|---|
| EP | 0 591 554 A1 | 4/1994 |
| GB | 2293920 | 4/1996 |

OTHER PUBLICATIONS

Chan, W. et al. (May 21–26, 1995). "An Investigation of Corner Rounding to Strengthen Silicon Micromachined Pressure Sensor for Fusion Bonded Wafers," *In Extended Abstracts: Spring Meeting*. The Electrochemical Society, Inc.: Pennington, NJ., pp. 649–650.

(List continued on next page.)

*Primary Examiner*—Eric S. McCall
(74) *Attorney, Agent, or Firm*—Morrison & Foerster LLP

(57) ABSTRACT

A gauge or differential pressure sensor has a base portion having walls which define a cavity within the base portion and a diaphragm portion positioned over the cavity. The base portion comprises silicon; the diaphragm portion comprises silicon; the substrate has a passageway from a surface of the substrate into the chamber; the walls of the cavity form an angle with the diaphragm of no more than ninety degrees; and the chamber has a depth of at least about 5 microns. Preferably, the pressure sensor has a lip within the passageway which prevents an adhesive used to glue the sensor to a base from flowing to the diaphragm and fouling it. The pressure sensor is made by forming a cavity in a first wafer, fusion bonding a second wafer over the first wafer in an oxidizing environment, and using the thin oxide formed when fusion bonding the wafers as an etch stop when opening the cavity to the atmosphere. Etch conditions are selected to form the preferred lip in the passageway. The pressure sensor has improved accuracy and reliability as well as small size.

2 Claims, 3 Drawing Sheets

U.S. PATENT DOCUMENTS

| | | | |
|---|---|---|---|
| 5,515,732 A | * 5/1996 | Willcox et al. | 73/724 |
| 5,520,054 A | * 5/1996 | Romo | 73/715 |
| 5,576,251 A | 11/1996 | Garabedian et al. | |
| 5,587,601 A | 12/1996 | Kurtz | |
| 5,614,678 A | 3/1997 | Kurtz et al. | |
| 5,631,198 A | * 5/1997 | Hartauer | 438/53 |
| 5,683,594 A | 11/1997 | Hocker et al. | |
| 6,109,113 A | * 8/2000 | Chavan et al. | 73/718 |

OTHER PUBLICATIONS

Goyal, A. et al. (Jan. 1993). "Formation of Silicon Reentrant Cavity Heat Sinks Using Anisotropic Etching and Direct Wafer Bonding," *IEEE Electron Device Letters* 14(1):29–32.

Petersen, K. (Jun. 24–27, 1991). "Surface Micromachined Structures Fabricated with Silicon Fusion Bonding," *Technical Digest of the International Conference on Solid State Sensors and Acuators, Transducers. Digest of Technical Papers*, San Francisco, CA, pp. 397–399.

Petersen, K. E. et al. (1988). "Silicon fusion bonding for pressure sensors," *Proceedings of IEEE Solid–State Sensor and Actuator Workshop*, Hilton Head Island, SC, pp. 144–147.

Schnakenberg, U. et al. (1991). "TMAHW Etchants for Silicon Micromachining," *Technical Digest of the International Conference on Solid State Sensors and Actuators, Transducers*, San Francisco, CA, pp. 815–817.

\* cited by examiner

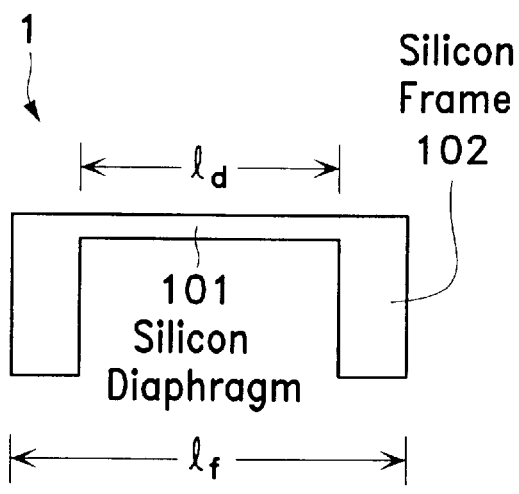
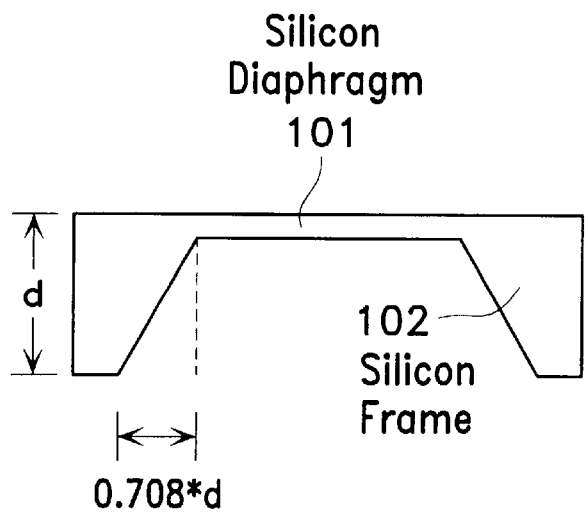
Fig. 1a
(PRIOR ART)
Fig. 1b
(PRIOR ART)
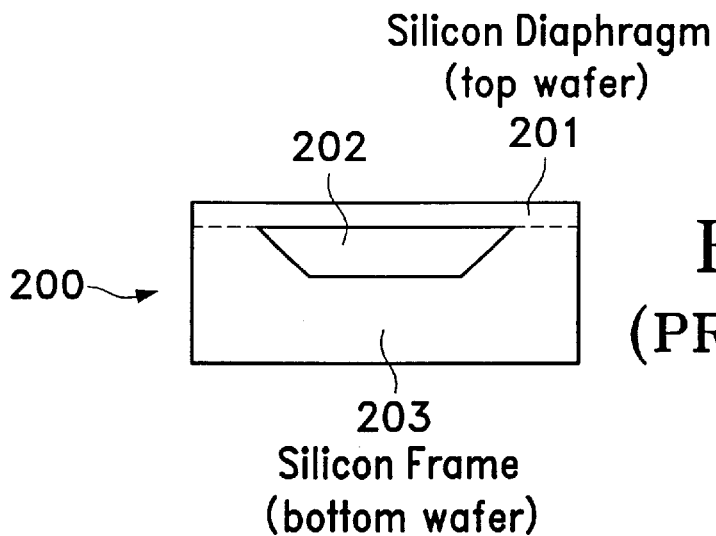
Fig. 2
(PRIOR ART)
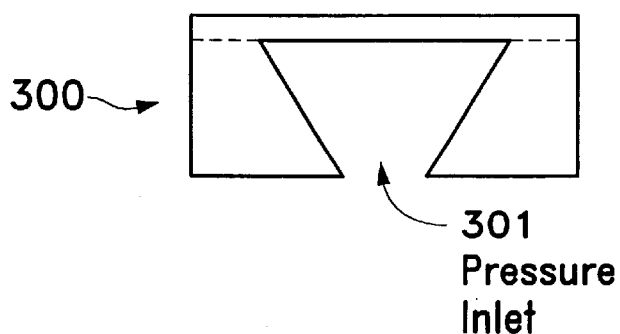
Fig. 3
(PRIOR ART)

MINIATURE GAUGE PRESSURE SENSOR USING SILICON FUSION BONDING AND BACK ETCHING

This application claims priority to U.S. Provisional Application Serial No. 60/027,515, filed Oct. 7, 1996 and is a continuation of U.S. Ser. No. 08/944,733, filed on Oct. 6, 1997, now U.S. Pat. No. 6,038,928.

BACKGROUND OF THE INVENTION

Micromachined pressure sensors are being incorporated into many products today in which it was impractical to incorporate larger conventional pressure sensors. Micromachined pressure sensors are being incorporated into such diverse equipment as medical instruments, laboratory instruments, industrial equipment, and automotive circuitry. Smaller, more accurate pressure sensors are needed for new generations of equipment in the medical, analytical, and industrial fields, yet the cost of these pressure sensors must remain low in order to provide instruments and equipment at reasonable prices.

Micromachined pressure sensors which measure absolute pressure are somewhat easier to fabricate than micromachined pressure sensors which measure gauge pressure or a pressure differential. One typical micromachined absolute-pressure sensor is made by forming a cavity within a first silicon wafer and then attaching a second silicon wafer to the first wafer and thinning the second wafer above the cavity, thereby providing a diaphragm over a sealed chamber. The absolute-pressure sensor measures pressure by sensing how much the pressure acting on the front side of the diaphragm deflects the diaphragm into the sealed chamber. Because standard fabrication procedures provide a very clean environment when the second wafer is attached to the cavity-containing wafer, essentially no dirt or debris which can interfere with deflection of the diaphragm enters the chamber. Further, the chamber and diaphragm can be fabricated to fairly precise dimensions, since the chamber is sealed and isolated from further processing which could modify the dimensions of the cavity and/or diaphragm.

Micromachined pressure sensors which measure gauge or differential pressure are more difficult to fabricate than micromachined absolute-pressure sensors. The cavity in the first silicon wafer must remain open during processing or must be opened at some point during processing to provide the channel to the back-side of the diaphragm that is necessary to allow gauge or differential pressure to be measured. Dirt or debris from processing steps can enter the cavity and remain within the cavity, interfering with the diaphragm as it deflects and causing the pressure sensor to supply inaccurate read-out of the pressure measured by the pressure sensor.

Also, since the cavity is exposed to subsequent processing, the cavity and back-side of the diaphragm are exposed to further processing steps that can etch away some of the materials from which the cavity and diaphragm are constructed. When diaphragm thickness is diminished, the diaphragm deflects further under a given pressure than a diaphragm having the expected thickness. The thinned diaphragm consequently provides a pressure sensor having a less-accurate readout of pressure than expected. The thinner diaphragm can also crack more easily during use, leading to reliability issues. Further, the shape of the cavity can be changed during subsequent processing, and if portions of the cavity supporting the diaphragm are removed, the accuracy and reliability of the pressure sensor can be adversely affected. The shape of the cavity supporting the diaphragm determines the shape (length and width) of the diaphragm, and when the shape of the pressure sensor's diaphragm differs from its expected shape, the pressure sensor provides a less accurate readout of pressure. If too much of the supporting walls of the cavity are removed, the diaphragm can be too large to withstand the forces imposed on it, and the diaphragm will fail.

It is desirable for a pressure sensor to have a rectangular cross sectional shape as shown in FIG. 1(a) in order to minimize the overall dimensions of the sensor. The minimum size and geometrical dimensions are established by the minimum length $l_d$ and width of the diaphragm 101 (for a particular pressure) and the minimum length $l_f$ and width of the frame 102 required for attaching the sensor 1 to an appropriate package.

One type of micromachined gauge pressure sensor is manufactured using anisotropic back etch processes to etch a single wafer and expose a thin silicon diaphragm supported over a silicon frame, as illustrated in FIG. 1(b). The wafer is subsequently etched from the backside to form a thin diaphragm upon which the piezoresistors are formed using typical means such as implantation and diffusions.

However, in actuality, it is known that the shape of the back etched structure is limited by the crystallographic planes of silicon. When (100) silicon wafers are used, as is often the case, the cavity takes on the shape of a trapezoid which tapers inwardly from the outer surface of the substrate to the diaphragm, as shown in FIG. 1(b). As a result, the die size is substantially increased beyond the minimum desired geometrical dimensions (FIG. 1(a)) by an amount proportional to the thickness d of the wafer and given by the formula 0.708*d. For example, commonly used 4" and 6" wafers are typically 500–700 $\mu$m thick resulting in an unnecessary increase in die size of 700 to 1000 $\mu$m.

Alternative fabrication methods have shown that the adverse effect of the slope of crystallographic planes on the overall die size can be reduced or eliminated for absolute pressure sensors. Silicon fusion bonding, where two silicon wafers can be bonded to each other to form one structural element, has been used to bond a top wafer 201, which is later thinned down to form the diaphragm, over a previously etched cavity 202 in a bottom wafer 203. The details of silicon fusion bonding are well published in the literature. As shown in FIG. 2, a cavity 202 is etched in the front side of the bottom wafer 203, and a diaphragm is made by fusion bonding a wafer 201 over the cavity and thinning the upper wafer to form a diaphragm. The cavity walls are now sloped inwards, tapering toward each other the further the walls are from the diaphragm. The sealed cavity provides a fixed and controlled pressure environment for the absolute pressure sensor 200.

There are problems with extending the above technique to the manufacture of gauge pressure sensors 300 by allowing the front side cavity to etch through the entire wafer, thus creating a pressure inlet 301 on the backside as illustrated in FIG. 3 before bonding the top wafer on and forming the diaphragm. While the proposal is theoretically possible, it is impractical because of the problems that arise due to lodging minute particulates in the cavity during processing. The particulate interferes with proper operation of the diaphragm, leading to faulty read-out of the pressure. To avoid this problem, it becomes necessary to form the back side pressure inlet after completion of all front-side processing thus guaranteeing cleanliness inside the cavity. The challenge in this final etch step is to ensure the integrity of the thin diaphragm and the cavity walls supporting the thin diaphragm. In other words, once the backside pressure inlet is fully etched, the etch should immediately stop and should not etch the thin diaphragm or chamber walls which are now exposed to the etching chemistry.

One way to perform the final etch yet insure integrity of the diaphragm and cavity walls is to grind the bottom wafer until the cavity is exposed, as disclosed by Petersen et al. in the article "Silicon Fusion Bonding for Pressure Sensors," Proceedings of IEEE Solid-State Sensor and Actuator Workshop, (Hilton Head, N.C.), 1988, p. 144. This method provides a pressure sensor as illustrated in FIG. 3. Others have deposited or thermally grown a layer of oxide over the cavity to protect it and the diaphragm during this back-side etch. See, e.g., U.S. Pat. Nos. 5,295,395 and 5,576,251. The pressure sensors disclosed in these patents can suffer from other problems. When etching is performed under conditions which produce a shallow cavity in the first wafer as shown in U.S. Pat. Nos. 5,295,395 and 5,576,251, often the thin diaphragm becomes stuck to the bottom floor of the cavity during processing. This stiction reduces the number of functional sensors that are produced from a wafer, which increases the cost of producing functional sensors. Removal of the thick oxide layer deposited in the chamber of the pressure sensor in the '395 patent also results in some of the silicon of the chamber and/or diaphragm being removed, since it takes a comparatively long period of time to remove all of the thick oxide within the chamber. Etching debris may also remain within the cavity and interfere with movement of the diaphragm when the oxide layer formed on the cavity of the first chamber prior to fusion bonding is etched using reactive ions.

As pressure sensors are fabricated to smaller dimensions, it becomes much more difficult to fabricate gauge-pressure sensors cleanly and precisely with little variance in diaphragm and cavity dimensions. Minor processing variations which can be tolerated for larger pressure sensors reduce the yield of acceptably-accurate and precise miniaturized gauge pressure sensors. Small variations in diaphragm thickness or length or shape result in large deviations in the pressure indicated by the pressure sensor. Consequently, a new method of making a gauge pressure sensor is needed to address the foregoing problems.

SUMMARY OF THE INVENTION

The invention provides a method of making a miniature gauge-pressure sensor and a substrate from which the pressure sensor is fabricated. The substrate is made by forming a cavity within a first wafer, so that the cavity has an opening to a surface of the first wafer. A second wafer is bonded to the first wafer so that at least a portion of the surface of the second wafer covers the opening of the cavity of the first wafer, and a thin, uniform layer of protective material which acts as an etch stop is deposited on the cavity walls and second wafer by e.g. fusion bonding the two wafers together in an oxidizing environment. The second wafer is thinned to form a diaphragm over the cavity, and the first wafer is etched to the thin layer of protective material using an etchant which preferably has a high selectivity for etching the wafer and not the protective material. The exposed protective material is subsequently removed using a second etchant which selectively removes the protective material and not the wafer or the diaphragm. The thin layer of protective material is removed, and the dimensions of the chamber and the diaphragm change little during processing. Elements such as piezoresistive or capacitive elements are fabricated on the diaphragm of the substrate to provide a pressure sensor.

Among other factors, the invention is based on the technical finding that a method of making a gauge-pressure sensor as described above produces gauge-pressure sensors which have high stiffness and which have a high degree of dimensional uniformity. This method requires fewer processing steps to prevent stiction than other methods require, and the method provides an inexpensive way to make miniature gauge pressure sensors which accurately sense gauge pressure. These technical findings and advantages and others are apparent from the discussion herein.

BRIEF DESCRIPTION OF THE DRAWINGS

FIG. 1(a) is a simplified cross-sectional diagram of an ideal pressure sensor with a supporting frame whose sidewalls are vertical;

FIG. 1(b) is a simplified cross-sectional diagram of commonly manufactured pressure sensor where the sidewalls of the supporting frame are sloped;

FIG. 2 is a simplified cross-sectional diagram of an absolute pressure sensor with a silicon fusion bonded diaphragm;

FIG. 3 is a simplified cross-sectional diagram illustrating the formation of a gauge pressure sensor by either etching the cavity of FIG. 2 through the entire bottom wafer or by grinding the bottom wafer to open the cavity of FIG. 2;

DETAILED DESCRIPTION OF THE PREFERRED EMBODIMENTS

Figure 4A:
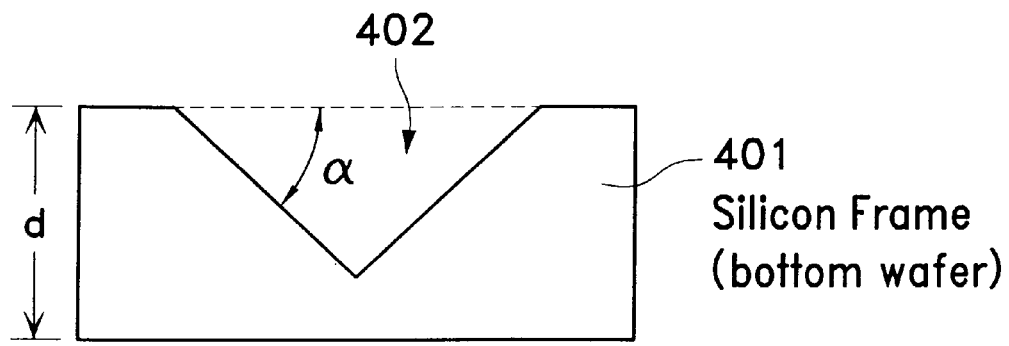
FIG. 4 is a simplified process flow illustrating the formation of a gauge pressure sensor by etching a pressure inlet from the back side.
Figure 4B:
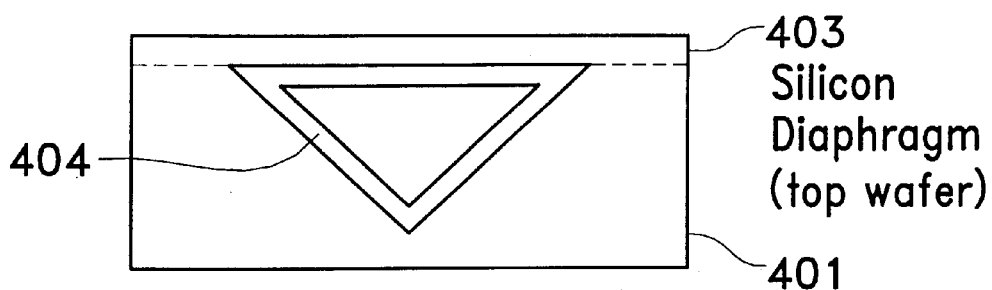
Figure 4C:
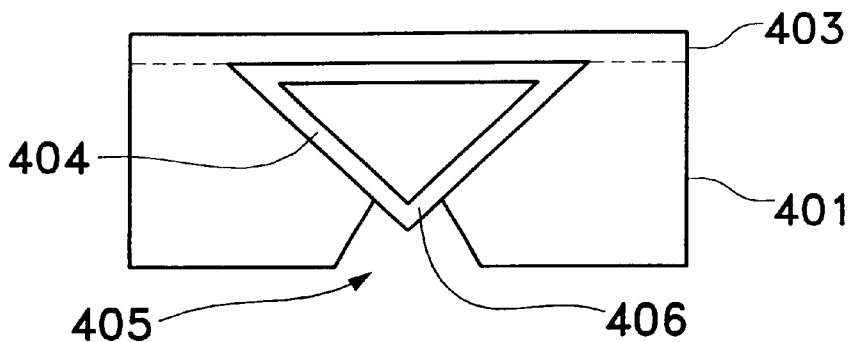

The present invention comprises a novel substrate for making a gauge or differential pressure sensor and an associated method to make the novel substrate and pressure sensor. The following description is presented to enable any person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Silicon pressure sensors were fabricated using 400 or 500 micron thick silicon wafers by the method illustrated in FIG. 4. An N-type (100) handle wafer (bottom wafer) 401 is initially coated on both sides with a protective layer such as silicon nitride. The protective layer on the front side of the wafer is patterned, and a cavity 402 is etched using an anisotropic etchant such as aqueous KOH. This anisotropic etch forms a cavity having walls which generally converge from the surface of the wafer to the bottom of the cavity, as illustrated in FIG. 4(a). The depth of the cavity can be controlled by adjusting the etch time.

The length and width or diameter of the cavity at the surface which is to support the diaphragm are selected based on the desired length and width of the diaphragm. If the depth of the cavity is smaller than $2*\tan(\alpha)*d$, where d is the wafer thickness and $\alpha$ is the angle between the (100) and (111) planes of silicon (54.7°), then it is desirable to etch the cavity until the etch stops at the intersecting (111) planes. The etched cavity is preferably 5–500 microns in depth at the deepest point of the cavity, when measured before forming a channel into e.g. the bottom of the cavity from the opposite side of the wafer. The etched cavity is more preferably at least about 200 microns deep. The nitride is subsequently removed.

Although an isotropic etch of the silicon wafer such as a reactive-ion etch using $SF_6$, $Cl_2$, $CCl_4$, or other etchants can be utilized, it is preferred to use an anisotropic etch in e.g. aqueous potassium hydroxide at 100° C. which forms cavity walls that generally converge as described above, so that the bottom of the cavity has a smaller surface area than the top of the cavity at the surface of the wafer. The die or pressure sensor is consequently very small, having a footprint of about 1 mm by 1 mm or even 500 microns by 500 microns.

An N-type (110) top or device wafer is used to form the diaphragm 403. The top wafer will usually have an epitaxial layer of silicon deposited on one face if the diaphragm is to have a thickness of less than approximately 50 microns. The thickness of the epi layer is based on the desired thickness of the diaphragm and is determined by methods well-known in the art. The thickness, width, length, and materials of construction of the diaphragm are selected by methods well-known in the art based on the range in differential pressure to which the pressure sensor is to be exposed.

The top and bottom wafers are treated to make the surfaces of the wafers to be bonded together hydrophilic. The wafers are treated with e.g. hot nitric acid or a hot sulfuric acid and hydrogen peroxide solution or another strong oxidant that causes water to adhere to the surface of the wafers. The top and bottom wafers are placed together so that the cavity within the bottom wafer is covered by the epi layer (if any) of the top wafer, thereby forming a chamber within the two substrates. Besides assisting during fusion bonding, this surface treatment helps to hold the two wafers together as they are transferred to an oven in which the bonding is to take place.

The two wafers are fusion bonded in an oxidizing environment and annealed at a temperature between about 950 and 1100° C. for a period of about 10 to 60 minutes to strengthen the bond between the wafers. During this process, a thin oxide layer 404 forms on the silicon walls of the cavity in the bottom wafer and on the portion of the top wafer that faces the cavity and forms an upper wall of the chamber. This thin oxide layer, typically between about 100 and 500 Å thick, acts as an etch-stop layer during subsequent processing. The oxidizing environment usually comprises oxygen gas, which can be used alone or which can be mixed with an inert gas such as nitrogen or argon. The concentration of oxygen in the gas mixture can be selected to provide a desired thickness of thin oxide on the chamber walls. Silicon fusion bonding is a well known process which has been described in detail by Petersen et al. in the article "Silicon Fusion Bonding for Pressure Sensors," Proceedings of IEEE Solid-State Sensor and Actuator Workshop, (Hilton Head, N.C.), 1988, p. 144. Preferably the thin oxide layer has a thickness of less than about 300 Å, so that any of the thin layer that is exposed in a later processing step is easy to remove without creating debris that can lodge in the chamber and interfere with normal deflection of the diaphragm and without etching a significant amount of silicon from the diaphragm and cavity walls.

The top wafer is thinned down to form the diaphragm or membrane 403 using a grind and polish process commonly used and commercially available. Alternatively, the top wafer can be thinned down by using electrochemical etching either with an etch stop (a reverse biased p-n junction) or using timed etching for thickness control.

A dielectric layer (e.g., oxide, nitride) is deposited or grown followed by forming the p-type piezoresistive sensing elements using ion implantation, deposition of a top insulating layer, contact opening through the insulating layer, and deposition and patterning of metal (e.g., Al) for electrical contacts. Or, instead of forming piezoresistive sensing elements, capacitive sensing elements may be formed by methods known in the art. Ways of making piezoresistive sensing elements are more fully explained in U.S. Pat. Nos. 4,904,978 and 5,614,678, the disclosures of which are incorporated by reference herein. The unbonded surface of the top wafer can be protected during subsequent processing steps by any of several means such as depositing a layer of oxide on the surface, mechanically clamping fixtures on, or waxing-on plates of glass or silica, which prevent the etch solution from degrading the unbonded surface of the wafer.

The protective layer on the back side of the handle wafer is now patterned for a silicon etch in order to form a channel 405 from the surface of the handle wafer to the chamber. The etch is performed in aqueous tetramethylammonium hydroxide (TMAH), with weight percentages varying from 5% to 25%. TMAH etches the wafer so that the walls of the channel being formed generally converge within the wafer. Due to the high selectivity of this etch to silicon oxide (>1000 to 1), as soon as the thin oxide lining the walls of the cavity is exposed from the back side 406, the etch essentially stops. This prevents the etch from attacking the diaphragm and/or chamber walls, thus preserving their integrity. Exposed aluminum features on the front side are protected by dissolving silicon in the TMAH solution as disclosed by Schnakenburg et al., "TMAHW Etchants for Silicon Micromachining," Technical Digest of the International Conference on Solid State Sensors and Actuators, Transducers '91, San Francisco, Calif., 1991, p. 815. Clearly, front side features can be protected by other means, such as deposition of an oxide layer that is removed after the etch is complete or as otherwise described above. Furthermore, other etch processes with a high selectivity to oxide can also be used. Examples include ethylene-diaminepyrocathecol solution mixtures (EDP) or reactive ion etching using fluorine based chemistries. All of the above processes are commercially available.

Figure 5:
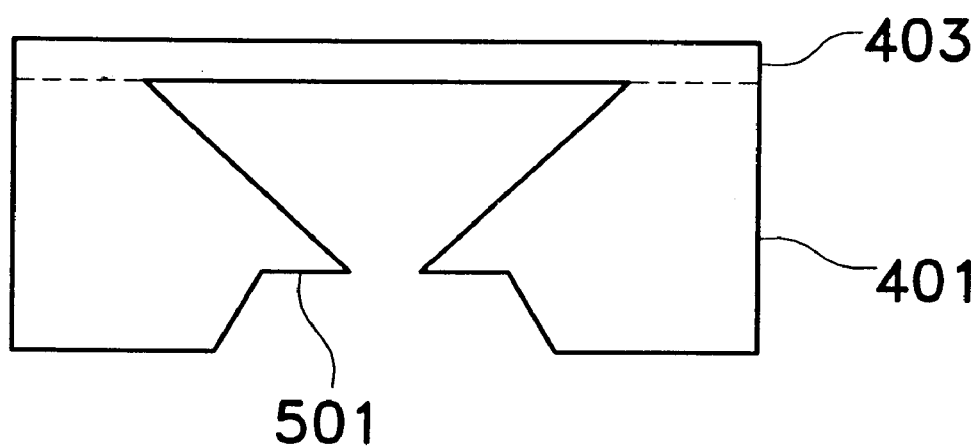
FIG. 5 is a simplified drawing of a pressure sensor which has a lip at the transition point between the cavity and the channel.

This silicon etch can be performed under conditions which produce a "lip" 501 at the interface between the channel and the cavity, as illustrated in FIG. 5. A large enough area of the back side of the bottom wafer is left unmasked that the etchant exposes part of the thin oxide layer of the cavity during etching. The exposed tip will appear as a small pyramid if the cavity was etched anisotropically as described above. If the channel is being etched anisotropically using, e.g., TMAH, etching is stopped prematurely, before the etchant has completed its etching along the (111) planes to the thin oxide layer. If the channel is being etched isotropically, the channel is etched wide enough and deep enough to remove some of the silicon wall of the cavity and expose part of the thin oxide layer. The lip prevents adhesive, which is used to glue the pressure sensor to a base, from migrating or oozing up the wall of the channel and fouling the diaphragm.

Figure 4D:
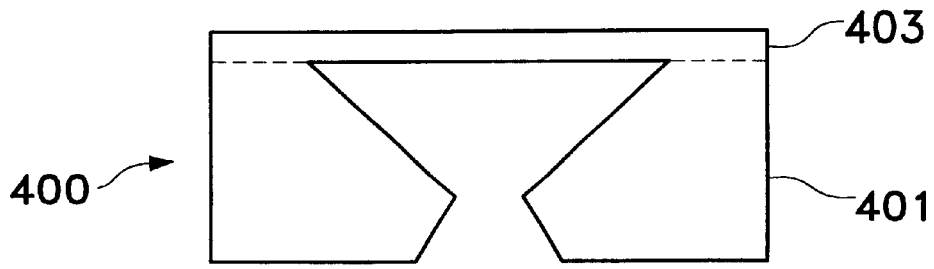

The exposed thin oxide layer 406 is removed in order to couple the channel to the chamber so that pressure from a fluid within the channel also acts on one side of the diaphragm of the pressure sensor as shown in FIG. 4(d). The exposed oxide 406 is removed using aqueous hydrofluoric acid (buffered or unbuffered), gaseous HF, a plasma oxide etch using $CHF_3/CF_4$, or other etchants known to preferentially remove oxide. Since the oxide layer is thin, little etching is required to remove the oxide, and the diaphragm and chamber remain essentially intact with little or no change in their dimensions. A wet etch is preferably used where essentially all of the protective oxide layer is to be removed from within the chamber.

A gauge pressure sensor 400 made by the method just described can be very small (1 mm×1 mm or even 500 microns×500 microns). The diaphragm of the pressure sensor is also well isolated from any forces at the interface between the bottom of the sensor and the material on which the sensor is mounted, since the bottom wafer in which the cavity is formed isolates the diaphragm from stresses at the sensor/bond interface and since the bottom wafer is made of the same material as the wafer carrying the diaphragm. Since the diaphragm is isolated from the stresses at the sensor/bond interface, the pressure sensor essentially reacts only to the pressures of the fluids that the sensor is designed to measure, improving the accuracy of the pressure sensor.

The diaphragm can be isolated even further from any sensor/bond interface stresses by fusion bonding a third silicon wafer to a pressure sensor in an oxygenated environment and etching a channel in the third wafer until the etch reaches the thin oxide layer on the third silicon wafer which forms between this wafer and the pressure sensor to which the third wafer is affixed. The oxide is then etched to open the channel to the chamber in the pressure sensor, preferably using a wet etch to prevent small chunks or flakes of oxide from dropping into the cavity. Additional wafers can be fusion bonded to this structure and etched until a sensor of the desired height or thickness is obtained. This method can be used to improve the accuracy of a conventional pressure sensor (gauge as illustrated in FIG. 1 or absolute) as well as a gauge pressure sensor of this invention.

As discussed previously, preferably the gauge pressure sensor of this invention has a lip at the interface between the channel and the cavity in the bottom wafer. The lip stops adhesive used to glue the pressure sensor to its mount from coming in contact with the diaphragm and altering its ability to flex.

What is claimed is:

1. A substrate which is useful in forming a gauge pressure sensor or differential pressure sensor, said substrate comprising:

a base portion having walls which define a cavity, and a diaphragm portion positioned over the cavity to form a chamber which includes the cavity;

wherein the base portion comprises silicon;

wherein the diaphragm portion comprises silicon;

wherein the substrate has a channel from a surface of the substrate to the chamber;

wherein the walls of the cavity form an angle with the diaphragm of no more than ninety degrees; and wherein the chamber has a depth in excess of 5 microns.

2. The substrate of claim 1 wherein the base portion is formed from a first silicon wafer, and the diaphragm portion is formed from a second silicon wafer.

* * * * *